(12) United States Patent
Andrews

(10) Patent No.: US 12,576,769 B1
(45) Date of Patent: Mar. 17, 2026

(54) BEVERAGE CONTAINER HOLDER SYSTEMS AND METHODS

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 95 days.

(21) Appl. No.: 18/046,133

(22) Filed: Oct. 12, 2022

Related U.S. Application Data

(60) Provisional application No. 63/262,436, filed on Oct. 12, 2021.

(51) Int. Cl.
B60N 3/10 (2006.01)

(52) U.S. Cl.
CPC .................................... B60N 3/103 (2013.01)

(58) Field of Classification Search
CPC ...................... B60N 3/10; B60N 3/103; B60R 2011/0052; B62J 11/00; B62J 2099/0033; B62J 35/00; B65D 21/0224; Y10S 206/821
USPC ................. 224/400; D7/601, 619.1; 206/503
See application file for complete search history.

(56) References Cited

U.S. PATENT DOCUMENTS

| | | | |
|---|---|---|---|
| D175,527 S | 9/1955 | Anson | |
| 3,285,455 A | * 11/1966 | Pewitt | ................ B65D 81/3879 215/393 |
| 3,317,069 A | 5/1967 | Wesley | |
| 5,054,733 A | 10/1991 | Shields | |
| D330,995 S | 11/1992 | Hartman et al. | |
| D368,235 S | 3/1996 | Weder et al. | |
| D376,121 S | 12/1996 | Weder et al. | |
| D384,859 S | 10/1997 | Cundieff | |
| D403,555 S | 1/1999 | Burns et al. | |
| 6,315,153 B1 | * 11/2001 | Osborn | .............. A47G 23/0216 220/737 |
| D498,198 S | 11/2004 | Buma | |
| 7,588,275 B2 | * 9/2009 | Borg | .................. B65D 21/0224 206/427 |
| 8,087,528 B1 | 1/2012 | Scarlett et al. | |
| D667,698 S | 9/2012 | Tupy et al. | |

(Continued)

FOREIGN PATENT DOCUMENTS

TW          M530772 U   * 10/2016

OTHER PUBLICATIONS

TW M530772 U Translation, Cai, Oct. 21, 2016 (Year: 2016).*

(Continued)

*Primary Examiner* — Justin M Larson
*Assistant Examiner* — Matthew T Theis
(74) *Attorney, Agent, or Firm* — Schacht Law Office, Inc.; Michael R. Schacht; Bronte Brillantes

(57) ABSTRACT

A beverage container holder adapted to be attached to a fuel cap comprises a base, an upper wall, a main passageway, and at least one clear opening. The base is adapted to engage the cap. The upper wall extends from the base and is adapted to engage the beverage container. The main passageway extends through the base and the upper wall and defines a container portion and a cap portion. The at least one clear opening is formed in the upper wall to allow debris within the container portion to be pushed out of the container portion through the at least one clear opening.

12 Claims, 13 Drawing Sheets

(56)                    References Cited

U.S. PATENT DOCUMENTS

| | | | |
|---|---|---|---|
| D922,832 S | 6/2021 | Vickroy | |
| 2012/0104010 A1* | 5/2012 | Kelley ...................... | B67C 3/14 |
| | | | 220/737 |

OTHER PUBLICATIONS

Amazon: Anti-Spill Cup Holder, Cube Tech, customer review oldest date Aug. 2, 2021 [online], [site visited Jul. 2, 2025], available from the internet URL: https://www.amazon.com/Anti-Spill-Holder-Coaster-Anti-Slip-Outdoors/dp/B088RD7P4Q/ (Year: 2021).

* cited by examiner

BEVERAGE CONTAINER HOLDER SYSTEMS AND METHODS

RELATED APPLICATIONS

This application, U.S. patent application Ser. No. 18/046,133 filed Oct. 12, 2022, claims benefit of U.S. Provisional Application Ser. No. 63/262,436 filed Oct. 12, 2021, the contents of which are incorporated herein by reference.

TECHNICAL FIELD

The present invention relates to beverage container holders for gas caps and, more particularly, to beverage container holders for gas caps of vehicles such as snowmobiles (or snow machines) that are subjected to snowy conditions.

BACKGROUND

Snowmobiles are motorized vehicles typically used for off road transportation in snowy conditions. The need thus exists for beverage container holder systems and methods that facilitate support by a snowmobile of a beverage adjacent to a rider operating the snowmobile.

SUMMARY

The present invention may be embodied as a beverage container holder adapted to be attached to a fuel cap comprising a base, an upper wall, a main passageway, and at least one clear opening. The base is adapted to engage the cap. The upper wall extends from the base and is adapted to engage the beverage container. The main passageway extends through the base and the upper wall and defines a container portion and a cap portion. The at least one clear opening is formed in the upper wall to allow debris within the container portion to be pushed out of the container portion through the at least one clear opening.

The present invention may also be embodied as a beverage container holder adapted to be attached to a fuel cap comprising a base, an upper wall, a main passageway, and at least one clear opening. The base defines at least one lock projection adapted to engage the cap. The upper wall extends from the base and is adapted to engage the beverage container. The main passageway extends through the base and the upper wall and defines a container portion and a cap portion. The at least one clear opening formed in the upper wall to allow debris within the container portion to be pushed out of the container portion through the at least one clear opening.

The present invention may also be embodied as a method of supporting a beverage container from a fuel cap comprising the following steps. A base, an upper wall extending from the base, a main passageway extending through the base and the upper wall, and at least one clear opening formed in the upper wall are provided. The main passageway defines a container portion and a cap portion. The base is arranged such that at least a portion of the cap is in the container portion of the main passageway and at least a portion of the base engages the cap. Debris within the container portion is forced out of the container portion through the at least one clear opening. At least a portion of the beverage container is arranged within the container portion of the main passageway such that the beverage container engages and is supported by the upper wall relative to the fuel cap.

DETAILED DESCRIPTION

The present invention is a beverage container holder for a fuel cap of a vehicle that may take on different configurations depending on the nature of the fuel cap. Several different examples of beverage container holders for a fuel cap will be described separately below.

I. First Example Beverage Container Holder

Figures 1, 2, 3:
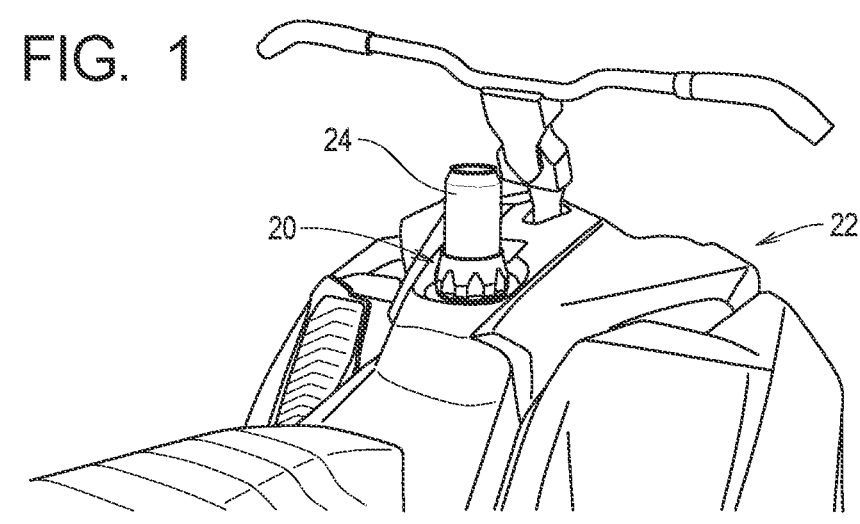
FIG. 1 is a perspective view of a first example beverage container holder of the present invention supported by a snowmobile and supporting a beverage container.
FIG. 2 is top perspective view of the first example beverage container holder.
FIG. 3 is bottom perspective view of the first example beverage container holder.
Figures 4, 5, 6:
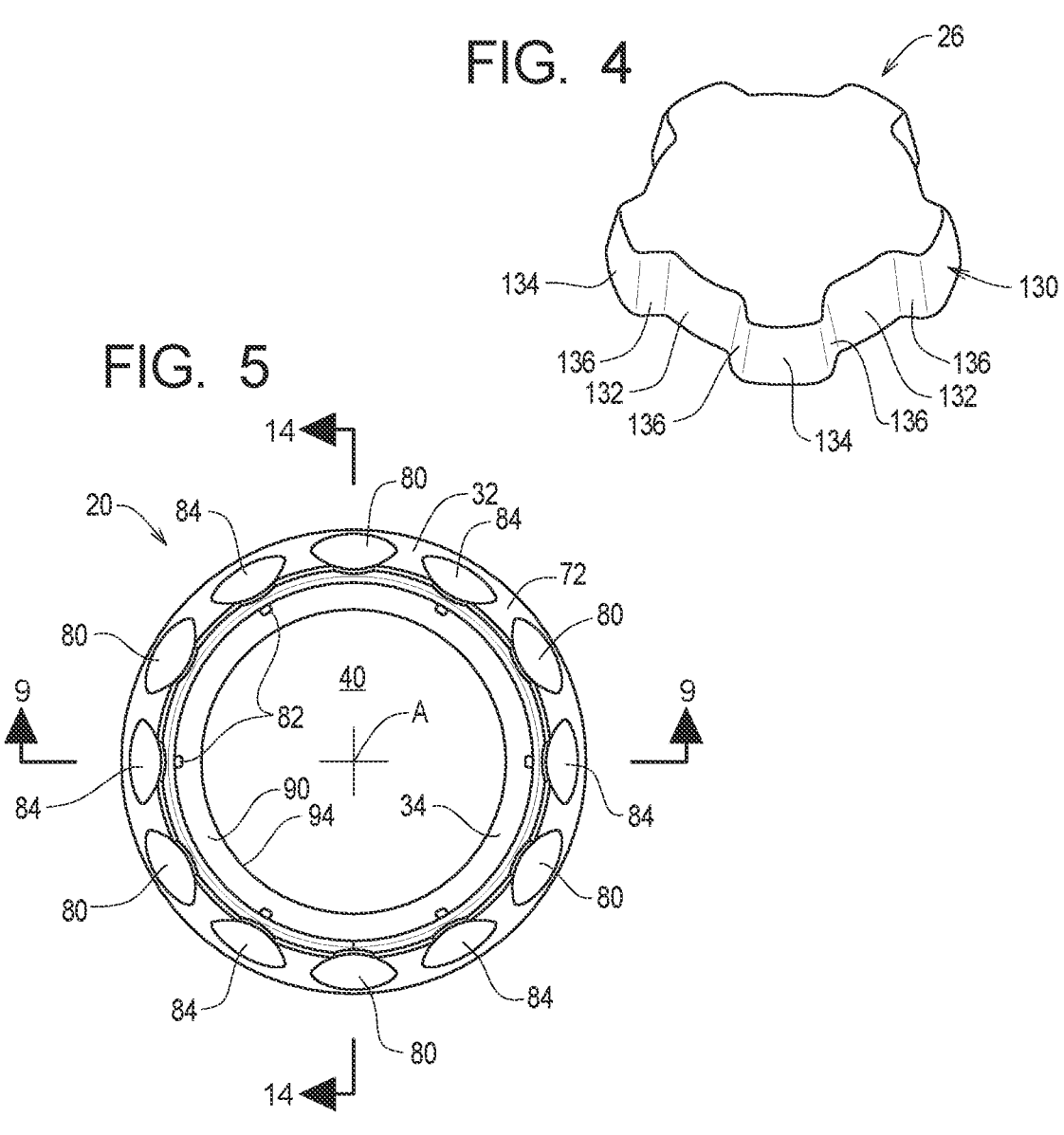
FIG. 4 is a top perspective view of a first example fuel cap detachably attached to the snowmobile.
FIG. 5 is a top plan view of the first example beverage container holder.
FIG. 6 is a front elevation view of the first example beverage container holder, the rear elevation view being the same.
Figure 7:
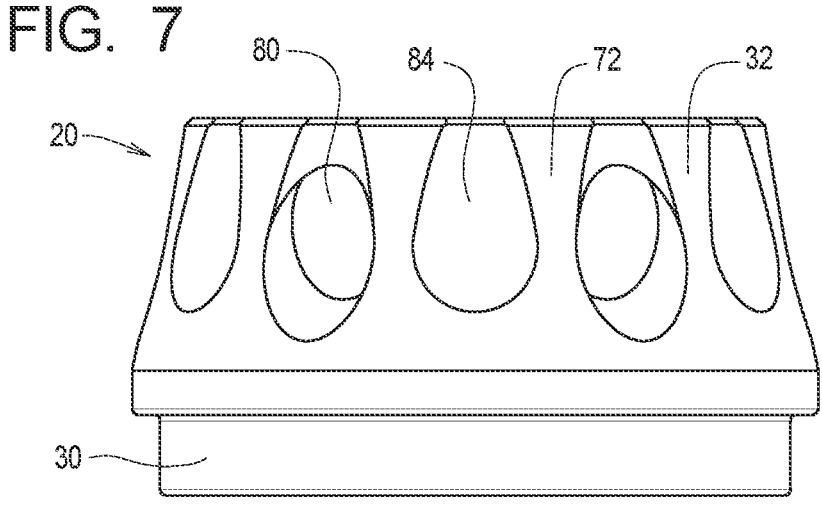
FIG. 7 is a side elevation view of the first example beverage container holder, the opposite side elevation view being the same.
Figure 8:
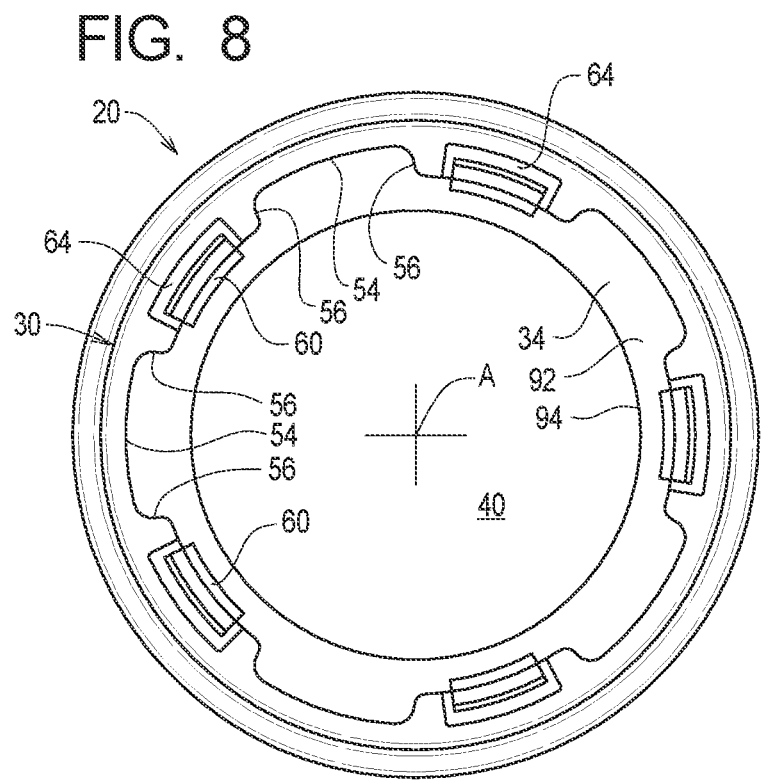
FIG. 8 is a bottom plan view of the first example beverage container holder.

FIGS. 1-3, 5-9, and 12-16 illustrate a first example beverage container holder 20 constructed in accordance with, and embodying, the principles of the present invention. As shown in FIG. 1, the first example beverage container holder 20 is configured to be used with a snowmobile system 22 and a beverage container 24. FIGS. 4, 10-13, and 15-16 illustrate a first example fuel cap 26 that forms a part of the example snowmobile system 22. The example snowmobile system 22, the example beverage container 24, and the example fuel cap 26 are or may be conventional and will not be described herein beyond that extent helpful to a complete understanding of the present invention.

Figure 9:
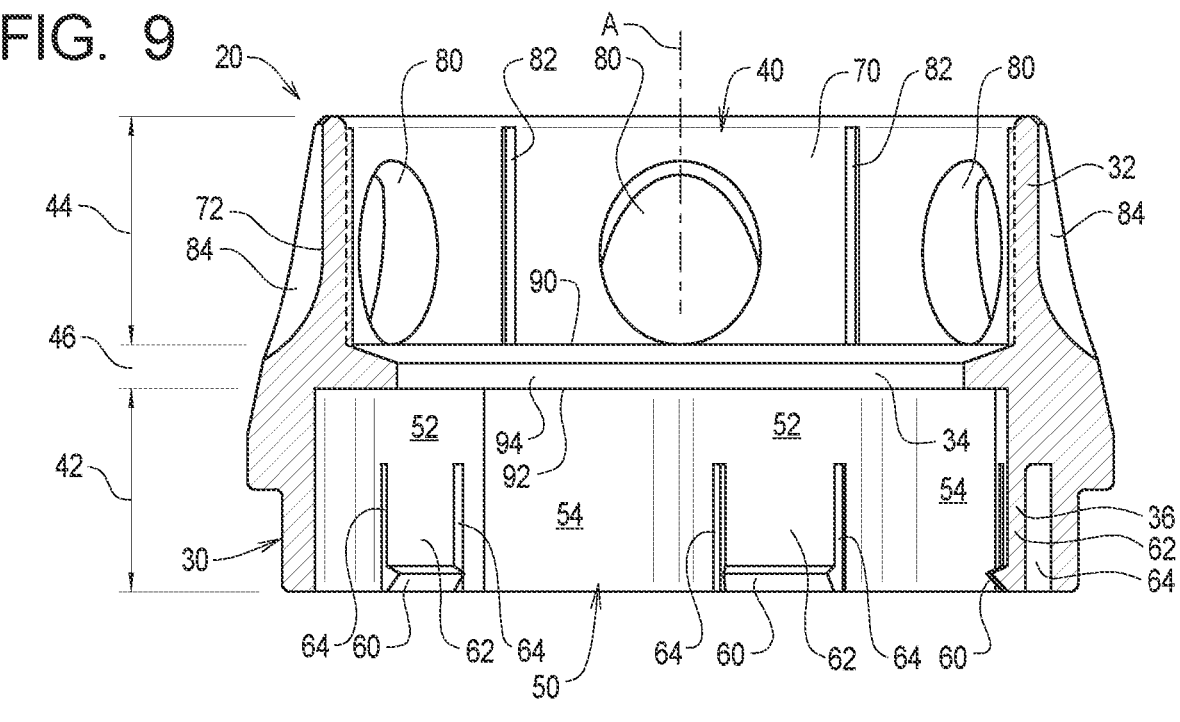
FIG. 9 is a section view taken along lines 9-9 in FIG. 5.
Figure 10:
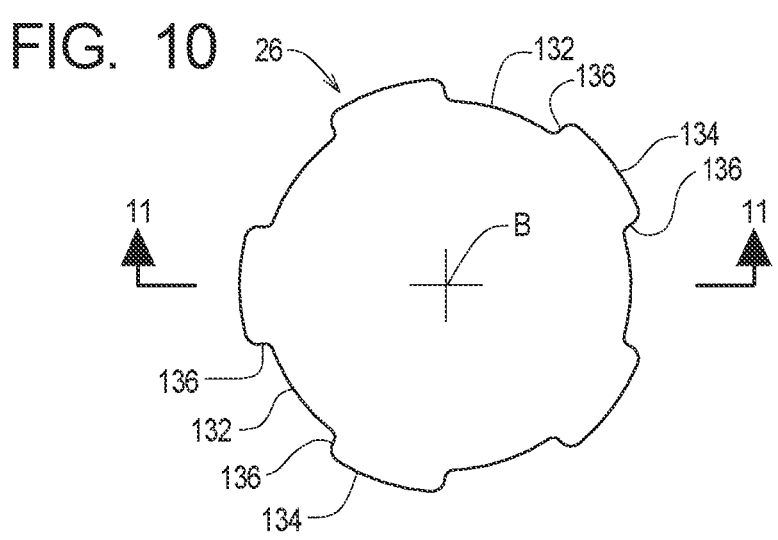
FIG. 10 is a top plan view of the first example fuel cap.
Figure 11:
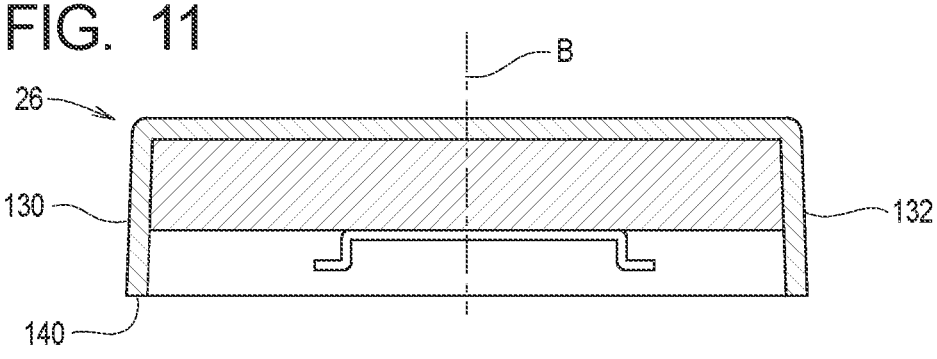
FIG. 11 is a section view taken along lines 11-11 in FIG. 10.

As shown in FIG. 9, the first example beverage container holder 20 comprises a base 30, an upper wall 32, a dividing wall 34, and at least one inner wall 36. A main passageway 40 extends through the first example beverage container holder 20. The example main passageway 40 defines a container portion 42, a container portion 44, and an intermediate portion 46.

The example base 30 defines a base inner surface 50 defining at least one base inner first surface portion 52, at least one base inner second surface portion 54, and a plurality of base inner third surface portions 56. The example base 30 comprises five base inner first surface portions 52, five base inner second surface portions 54, and ten base inner third surface portions 56 that are symmetrically arranged about a longitudinal axis A of the example base 30. The example base inner first portions 52 are formed on the at least one inner wall 36 defined by the base 30. The example base 30 defines the container portion 42 of the main passageway 40.

The example base 30 further defines at least one lock projection 60. The example lock projection 60 is formed on at least one of the base inner surface first portions 52. In the example base 30, one of the example lock projections 60 is formed on each of the base first portions 52. Further, each example lock projection 60 is formed on a detent tab 62, and each example detent tab 62 is at least partially defined by a cutout 64 in the base first inner portions 52. Each detent tab 62 is deformable relative to the base first inner portion 52 in which the detent tab 62 is formed to allow the example lock projection 60 on the detent tab 62 to be displaced relative to the longitudinal axis A of the example base 30.

The upper wall 32 of the first example beverage container holder 20 defines an upper wall inner surface 70 and an upper wall outer surface 72. At least one clear hole 80 extends between the upper wall inner surface 70 and the upper wall outer surface 72. In the example upper wall 32, at least one friction rib 82 is formed on the upper wall inner surface 70. Further, at least one grip surface 84 is formed on the upper wall outer surface 72 to facilitate gripping of the upper wall outer surface 72 as will be described in further detail below. The example upper wall 32 defines the container portion 44 of the main passageway 40.

The example dividing wall 34 is annular and defines a dividing wall upper surface 90, a dividing wall lower surface 92, and a dividing wall opening surface 94. The example dividing wall opening surface 94 defines the intermediate portion 46 of the main passageway 40.

The example beverage container 24 defines a side wall 120 and a bottom wall 122. The example beverage container 24 is a beverage can, cups, bottles, flasks, and other types of beverage containers may be supported by the first example cupholder system 20.

As is conventional, the example fuel cap 26 is adapted to be secured to the snowmobile 22 to cover a fuel tank inlet (not visible in FIG. 1) defined by the snowmobile 22. The example fuel cap 26 defines a cap outer surface comprising at least one cap outer surface 140 defining at least one cap outer first surface portion 132, at least one cap outer second surface portion 134, and a plurality of cap outer third surface portions 136. The example fuel cap 26 comprises five cap outer first surface portions 132, five cap outer second surface portions 134, and ten cap outer third surface portions 136 that are symmetrically arranged about a longitudinal axis B of the fuel cap 26. The example fuel cap 26 further defines a cap lower edge 150.

Figure 12:
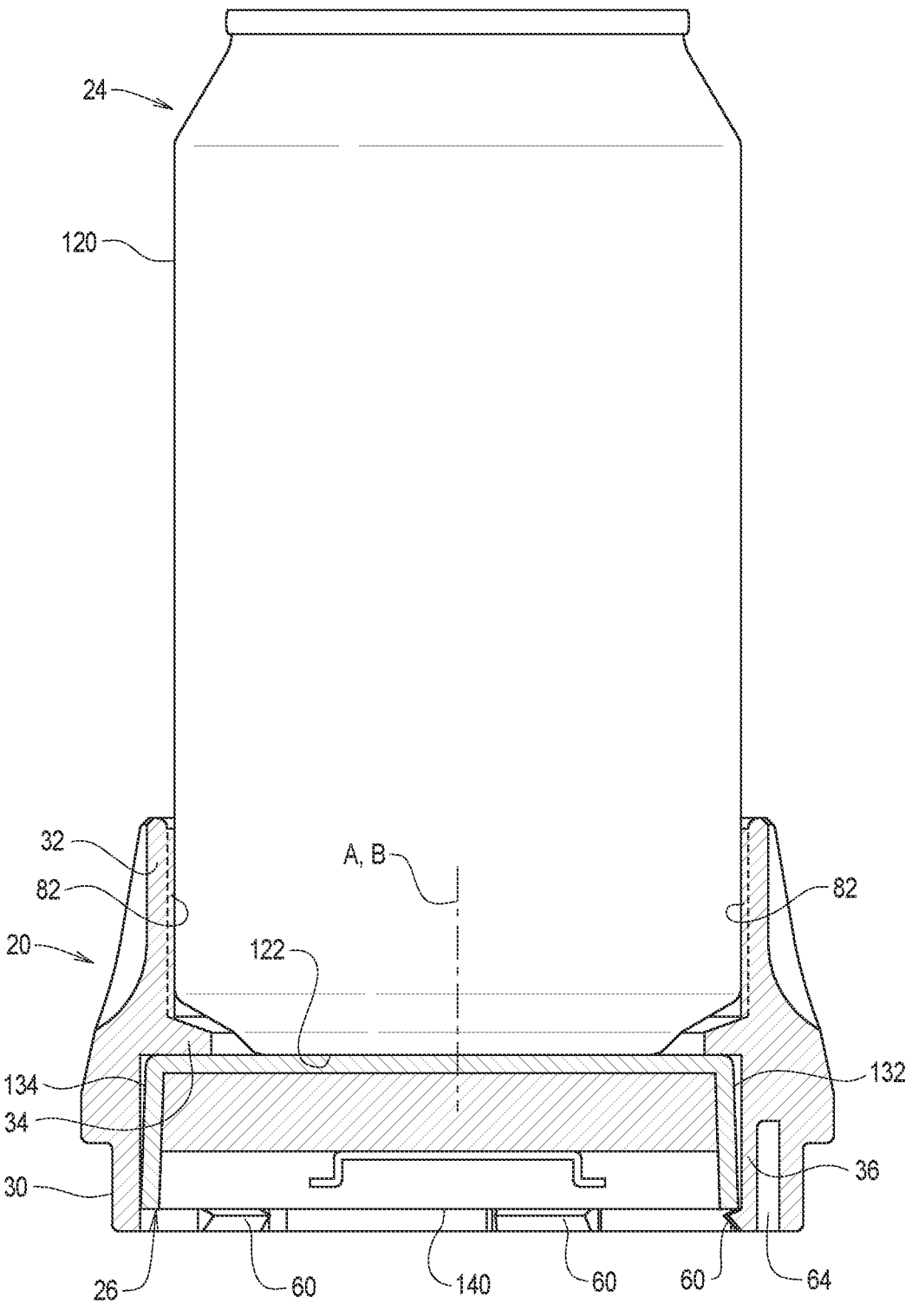
FIG. 12 is a partial section view similar to FIG. 11 illustrating the engagement of the first example beverage container holder with the first example gas cap and engagement of the first example beverage container holder with the example beverage container.
Figure 13:
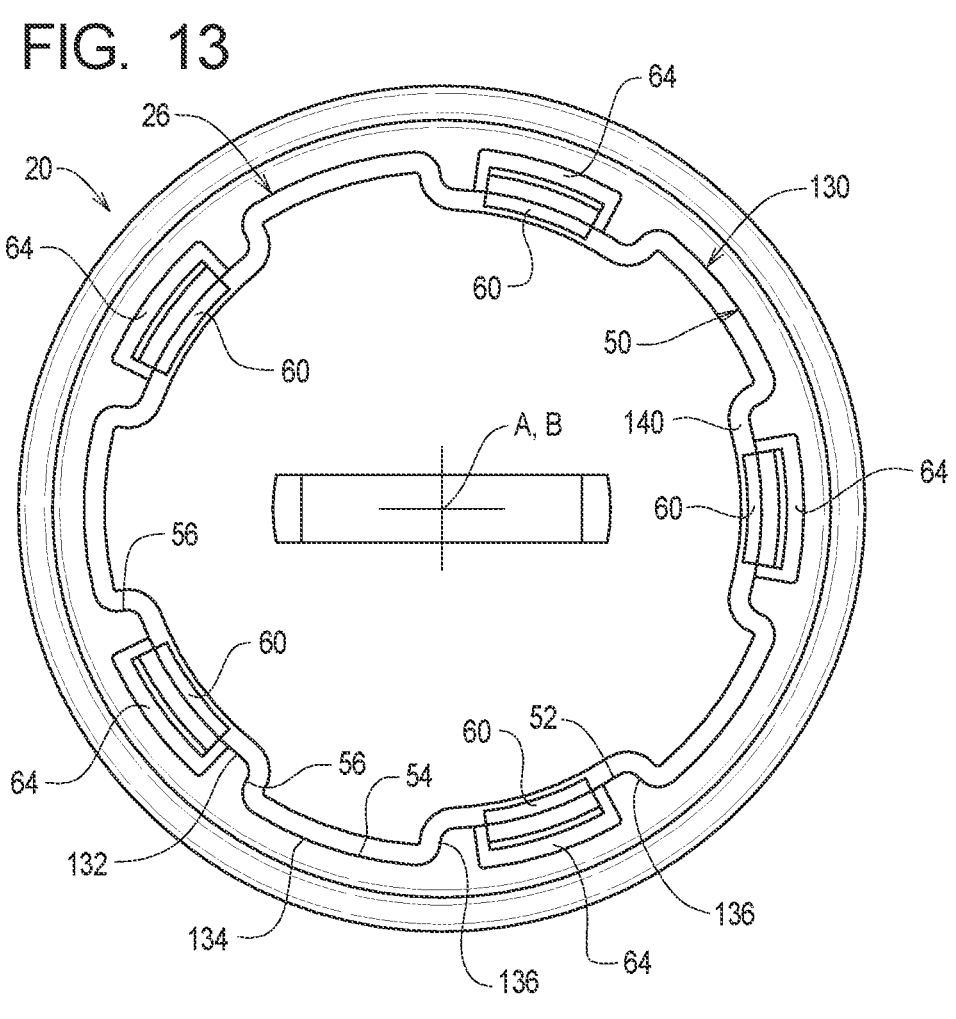
FIG. 13 is a bottom plan view of the first example beverage container holder being supported by the first example gas cap engaged.

As is apparent in the bottom plan view of FIG. 13, the shape of the example base inner surface 50 substantially matches, but is slightly larger than, the shape of the cap outer surface 130. In particular, the base inner surface first portions 52 are configured to accommodate the cap outer surface first portions 132, the base inner surface second portions 54 are configured to accommodate the cap outer surface second portions 134, and the base inner surface third portions 56 are configured to accommodate the cap outer surface first portions 136. The respective shapes of the base inner surface 50 and cap outer surface 130 are thus configured relative to the cap outer surface 130 such that, with the first and second axes A and B aligned and with an angular position of the first example beverage container holder 20 in a desired orientation relative to an angular position of the fuel cap 26, the first example beverage holder 20 may be displaced along the axis B into a locked position as shown in FIGS. 12, 13, 15 and 16.

In the locked position, at least a portion of the fuel cap 26 is arranged within the container portion 42 of the main passageway 40 such that the lock projection(s) 60 is (are) arranged under the cap lower edge 150, thereby inhibiting removal of the first example beverage holder 20 from the fuel cap 26. If used, the detent tabs 62 may deflect or resiliently deform as necessary to allow the lock projection(s) 60 to pass along the cap outer surface 130 and then retract or return to the undeflected position when the detent tab(s) 62 clear the cap lower edge 150. Deliberate application of force on the first example beverage container holder 20 allows the first example beverage container holder 24 to be removed from the fuel cap 26. If used, the detent tab(s) 62 may deflect or resiliently deform to allow the lock projection(s) 60 to clear the cap lower edge 150.

In the locked position, the base inner surface engaging portion(s) 56 engage the cap outer surface engaging portions 136 to transfer angular rotation of the first example beverage container holder 20 to the fuel cap 26. The fuel cap 26 may thus be removed and/or replaced by gripping the first example beverage container holder 20. The grip surface(s) 84 on the upper wall 32 facilitate gripping of the first example beverage container holder 20.

Figure 14:
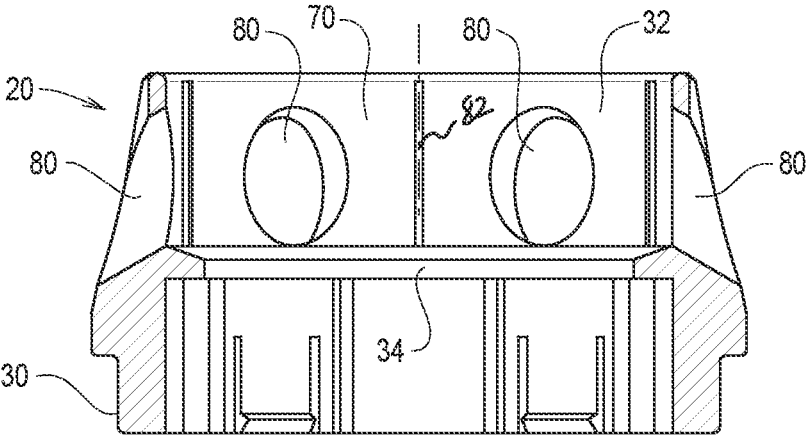
FIG. 14 is a section view taken along lines 14-14 in FIG. 5.
Figure 15:
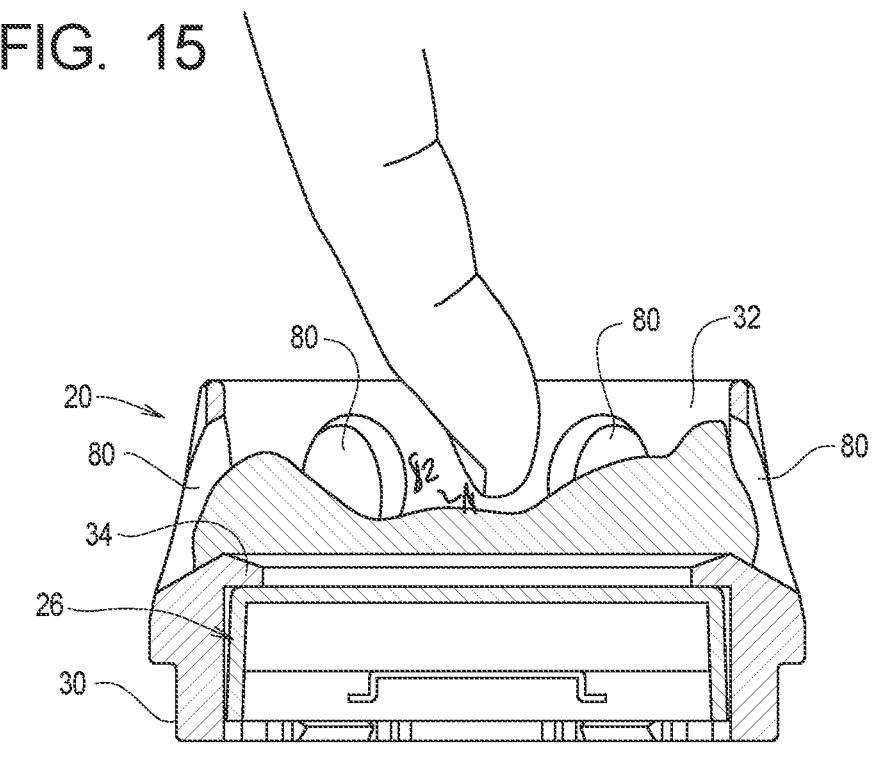
FIG. 15 is a section view similar to FIG. 15 showing snow accumulation within the first example beverage container holder.
Figure 16:
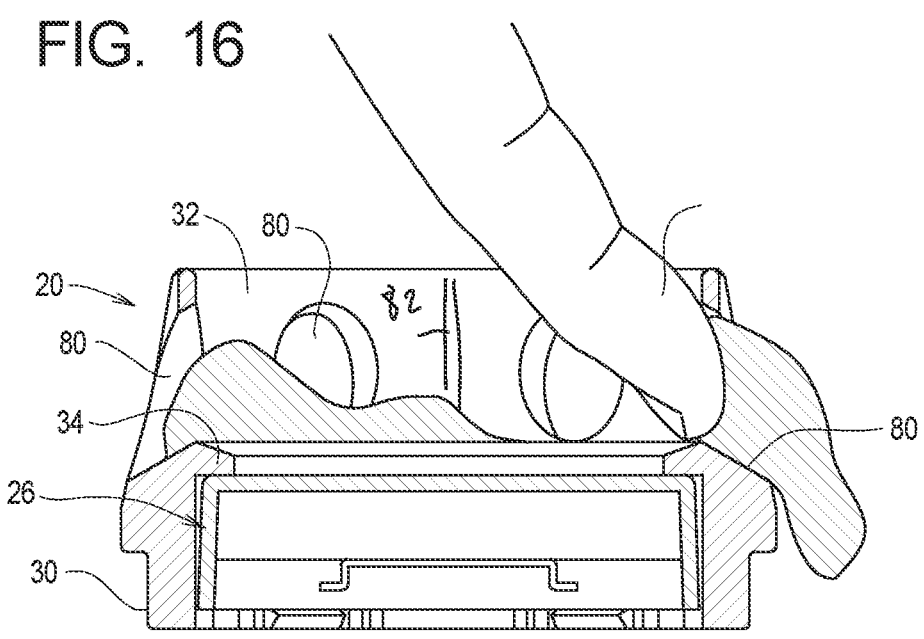
FIG. 16 is a section view similar to FIG. 14 showing removal of snow accumulation from within the first example beverage container holder.
Figure 17:
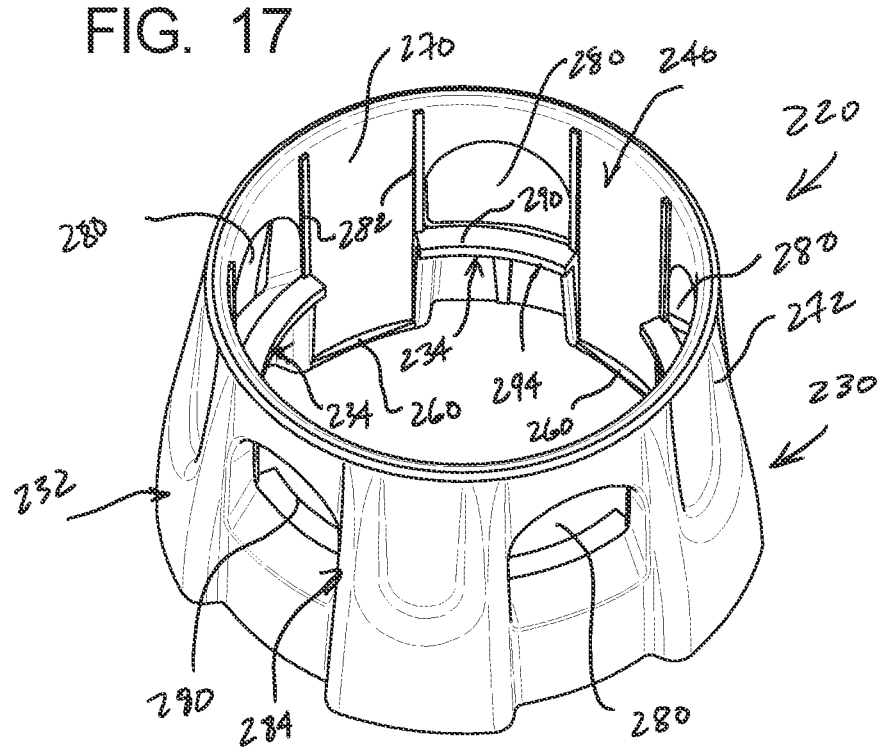
FIG. 17 is a top perspective view of a second example beverage container holder.
Figure 18:
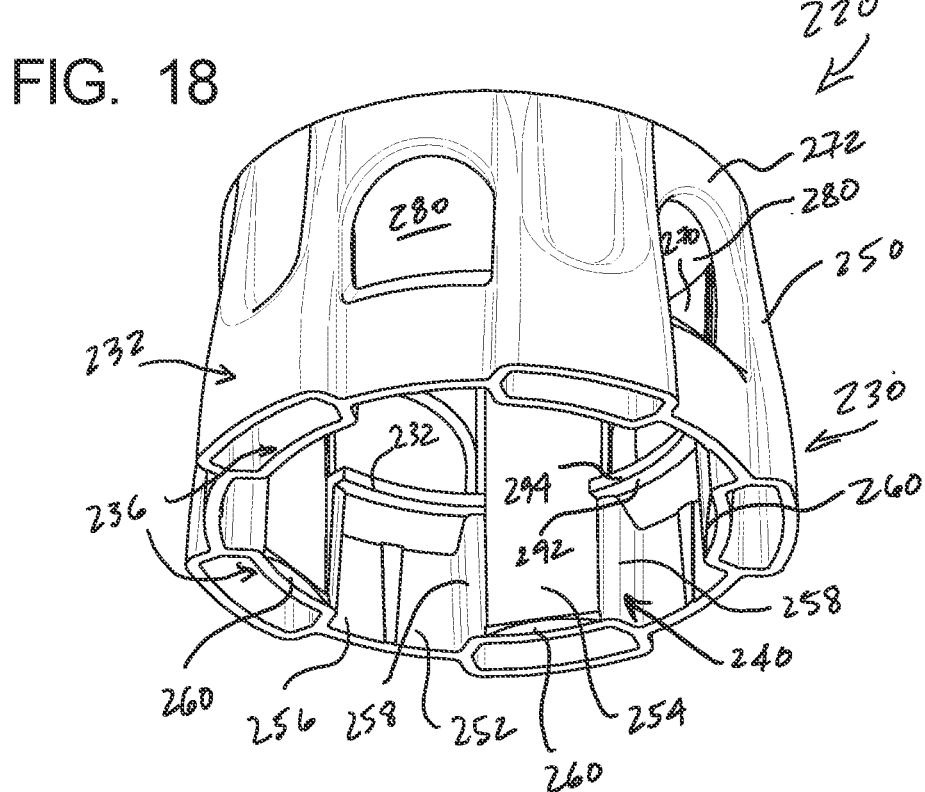
FIG. 18 is a bottom perspective view of the second example beverage container holder.
Figure 19:
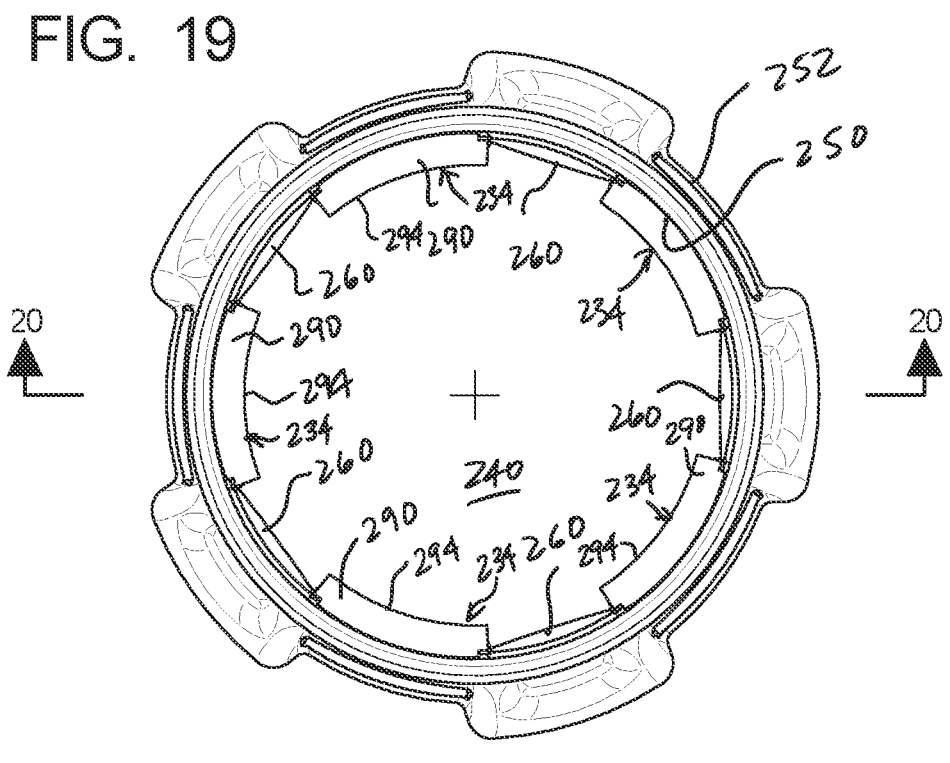
FIG. 19 is a top plan view of the second example beverage container holder.
Figure 20:
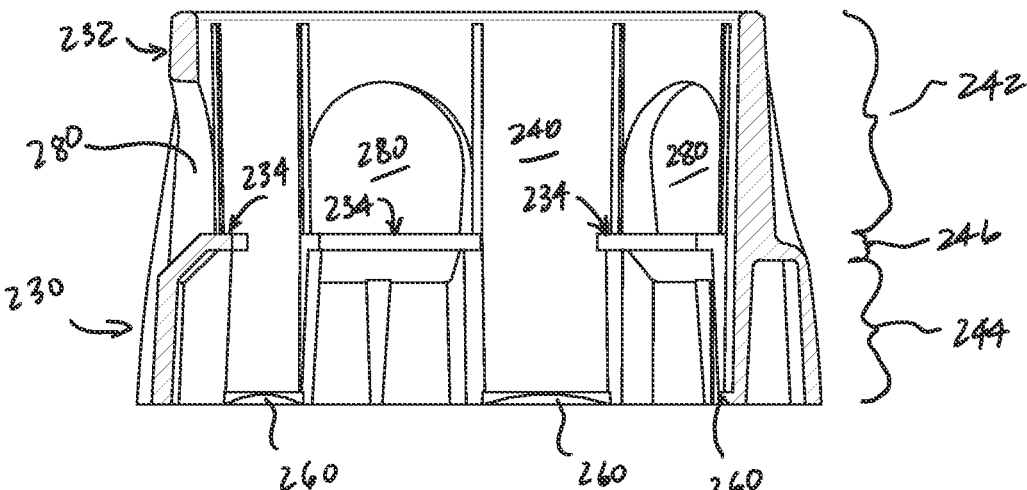
FIG. 20 is a section view taken along lines 20-20 in FIG. 19.

As shown in FIGS. 14 and 15, the clear holes 80 in the upper wall 32 allow any snow or ice that collects within the cup portion 44 of the main passageway 40 to be pushed out of the cup portion 44.

With the cup portion 44 clear of snow or ice, the beverage container 24 may be arranged at least partly within the cup portion 44 of the main passageway 40 as shown in FIGS. 1 and 12. FIG. 12 illustrates that the friction ribs 82 engage the side wall 120 of the beverage container 24 to inhibit movement of the beverage container 24 relative to the first example beverage container holder 20. The beverage container 24 may be engaged with and removed from the first example beverage container holder 20 by deliberate application of manual force on the beverage container 24.

II. Second Example Beverage Container Holder

FIGS. 17-22 illustrate a second example beverage container holder 220 constructed in accordance with, and embodying, the principles of the present invention. The second example beverage container holder 220 is configured to be used with a snowmobile system like the snowmobile system 22 and a beverage container 222. The second example beverage container holder 220 is configured to be supported by a second example fuel cap 224 depicted in FIGS. 21 and 22. The example beverage container 222 and the example fuel cap 224 are or may be conventional and will not be described herein beyond that extent helpful to a complete understanding of the present invention. As is conventional, the example fuel cap 224 defines a cap outer surface 226 and a cap lower edge 228 and is adapted to be secured to a snowmobile to cover a fuel tank inlet defined by the snowmobile.

The second example beverage container holder 220 comprises a base 230, an upper wall 232, a dividing wall 234, and at least one inner wall 236. A main passageway 240 extends through the second example beverage container holder 220. The example main passageway 240 defines a container portion 242, a cup portion 244, and an intermediate portion 246.

The example base 230 defines a base inner surface 250 and a base outer surface 252. The base inner surface 250 defines at least one base inner first surface portion(s) 254, at least one base inner second surface portion(s) 256, and a plurality of base inner third surface portion(s) 258. The example base 230 comprises five base inner first surface portion(s) 254, five base inner second surface portion(s) 256, and ten base inner third surface portion(s) 258 that are symmetrically arranged about a longitudinal axis A of the example base 230. The example base inner first portions 252 are formed on the at least one inner wall 236 defined by the base 230. The example base 230 defines the container portion 242 of the main passageway 240.

The example base 230 further defines at least one lock projection 260. The example lock projection 260 is formed on at least one of the base inner surface first portions 252. In the example base 230, one of the example lock projections 260 is formed on each of the base first portions 252.

The upper wall 232 of the second example beverage container holder 220 defines an upper wall inner surface 270 and an upper wall outer surface 272. At least one clear hole 280 extends between the upper wall inner surface 270 and the upper wall outer surface 272. In the example upper wall 232, at least one friction rib 282 is formed on the upper wall inner surface 270. Further, at least one grip surface 284 is formed on the upper wall outer surface 272 to facilitate gripping of the upper wall outer surface 272 as will be described in further detail below. The example upper wall 232 defines the container portion 244 of the main passageway 240.

The example dividing wall 234 is annular and defines a dividing wall upper surface 290, a dividing wall lower surface 292, and a dividing wall opening surface 294. The example dividing wall opening surface 294 defines the intermediate portion 246 of the main passageway 240.

Figure 21:
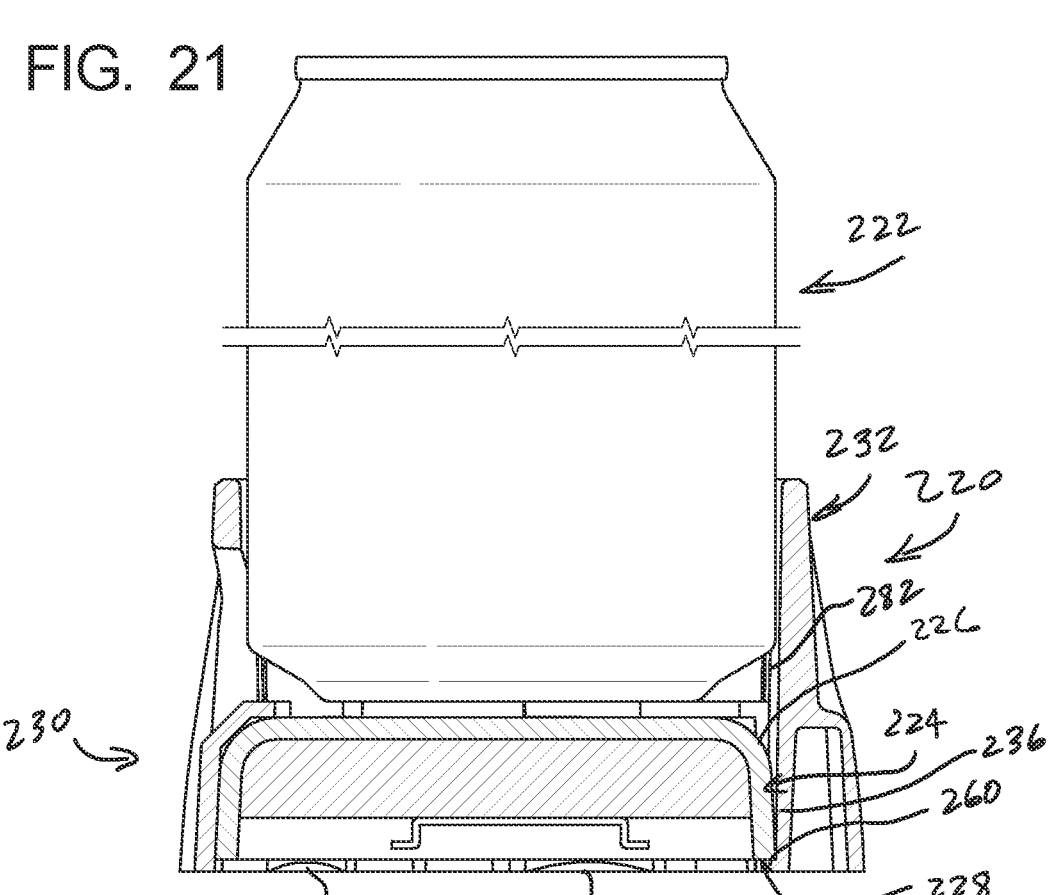
FIG. 21 is a section view of the second example beverage container holder supported by a second example fuel cap and supporting the example beverage container.
Figure 22:
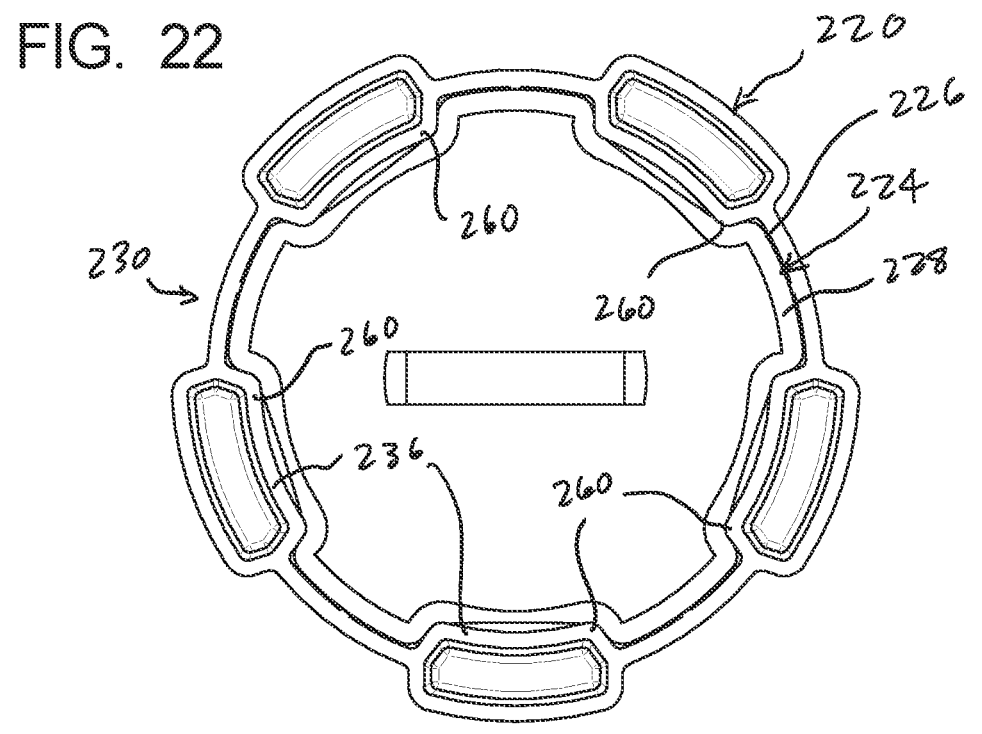
FIG. 22 is a bottom plan view of the second example beverage container holder supported by the second example fuel cap.
Figure 23:
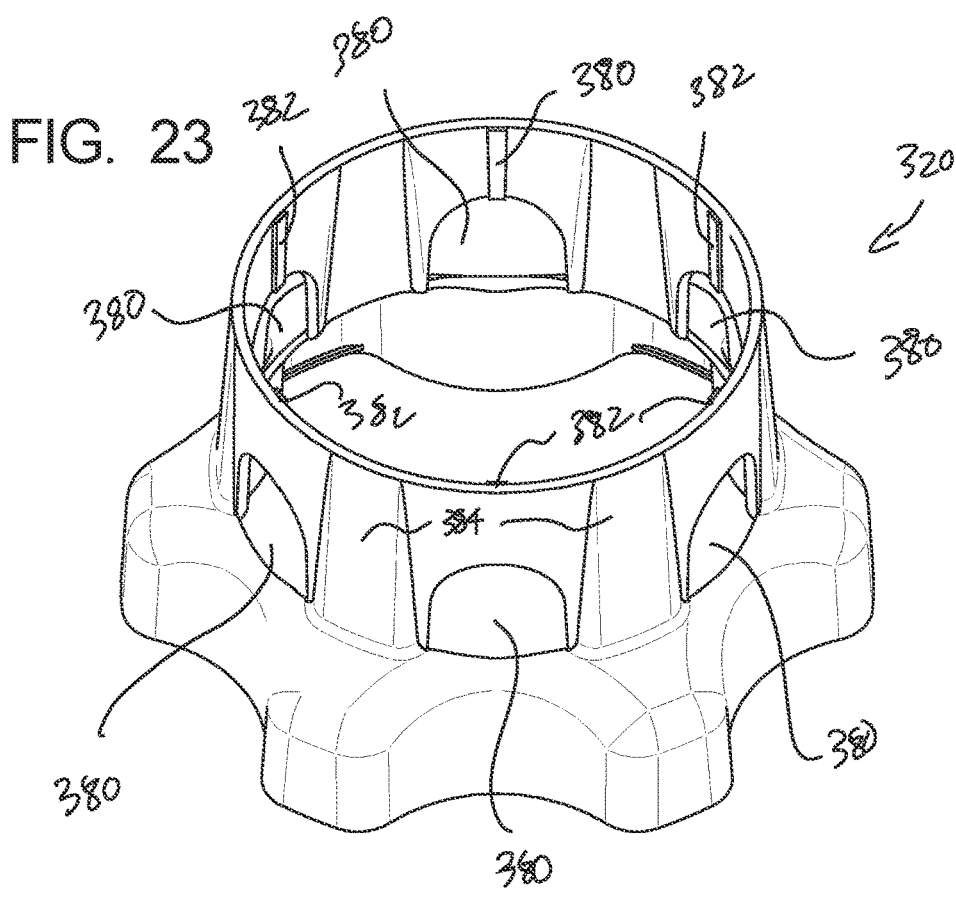
FIG. 23 is a top perspective view of a third example beverage container holder.
Figure 24:
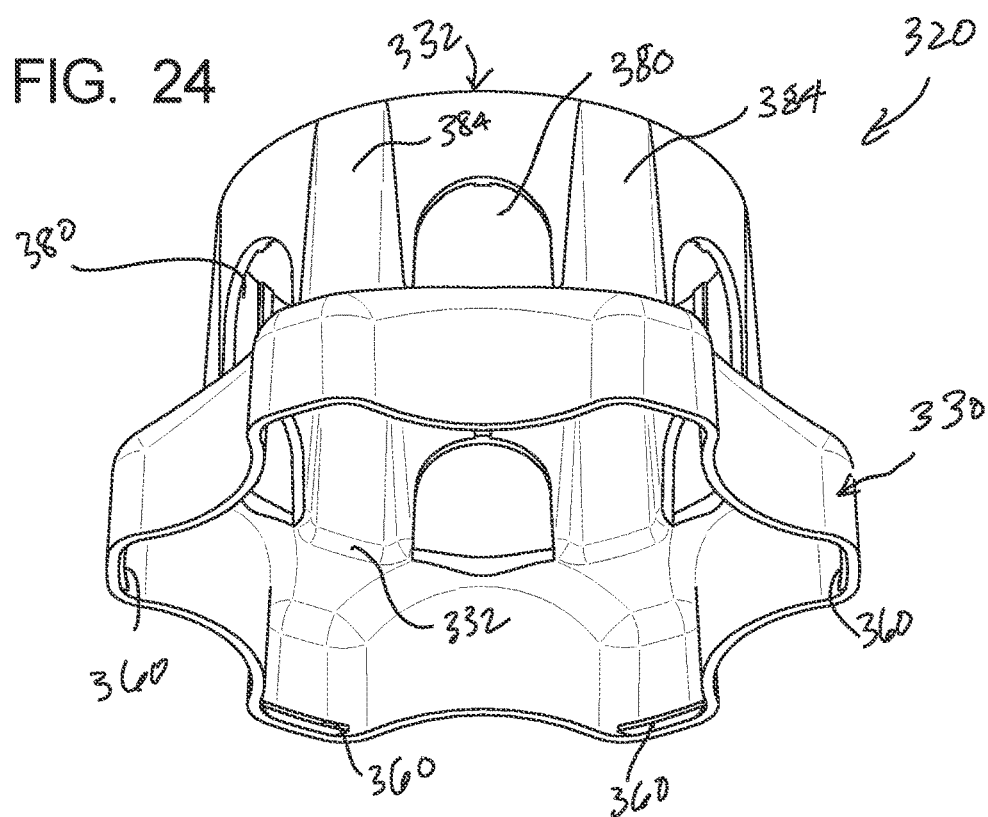
FIG. 24 is a bottom perspective view of the third example beverage container holder.
Figures 25, 26:
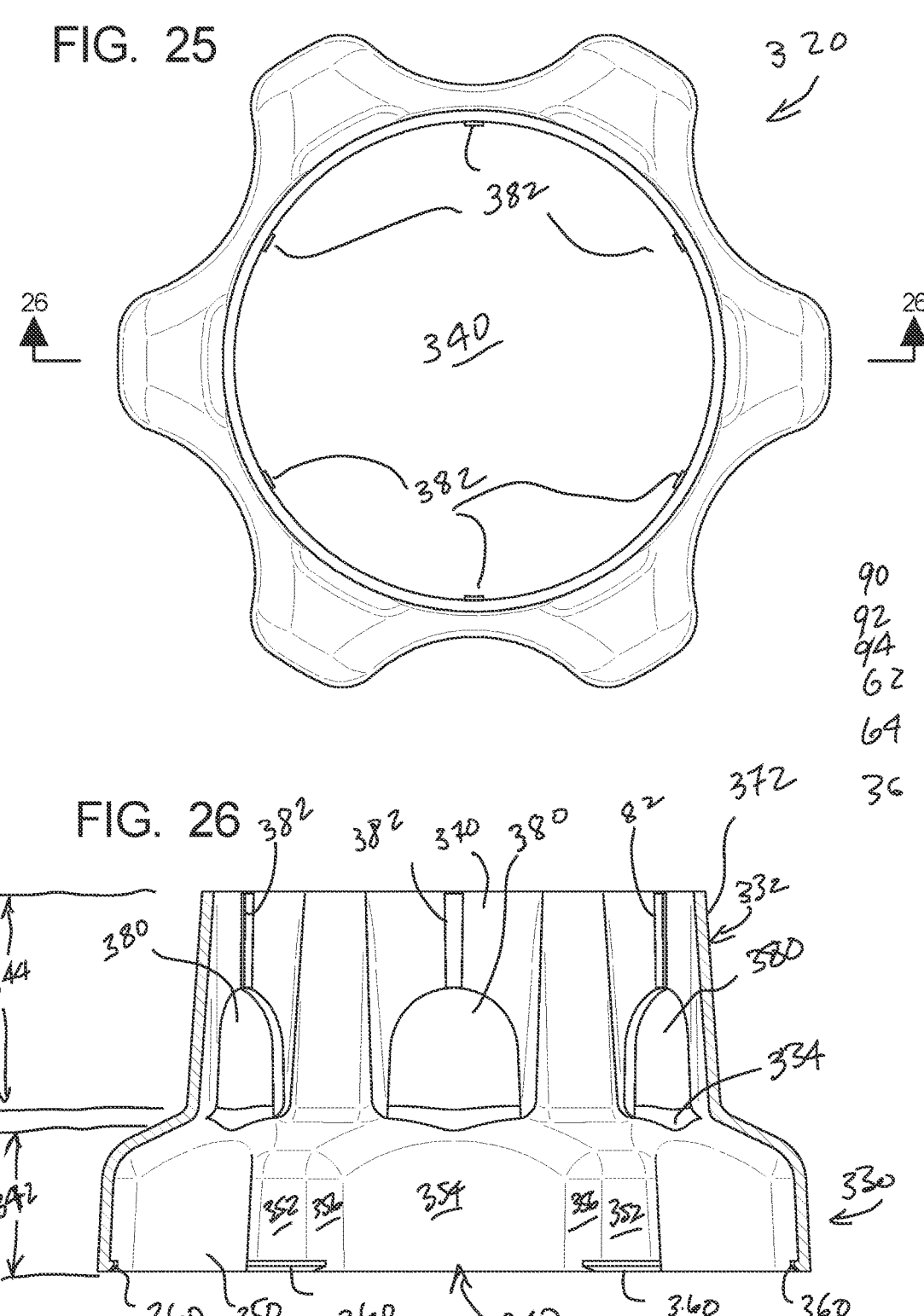
FIG. 25 is a top plan view of the third example beverage container holder.
FIG. 26 is a section view taken along lines 26-26 in FIG. 25.

As is apparent in the bottom plan view of FIG. 22, the shape of the example base inner surface 250 substantially matches, but is slightly larger than, the shape of the outer surface 224 of the fuel cap 224. The respective shapes of the base inner surface 250 and cap outer surface 226 are thus configured relative to the cap outer surface 226 such that, with the first and second axes A and B aligned and with an angular position of the second example beverage container holder 220 in a desired orientation relative to an angular position of the fuel cap 224, the second example beverage holder 220 may be displaced along the axis B into a locked position as shown in FIGS. 21 and 22.

In the locked position, at least a portion of the fuel cap 224 is arranged within the container portion 242 of the main passageway 240. One or more of the base inner surface engaging portion(s) 256 engage may frictionally engage the fuel cap to detachably attach the beverage container holder 220 to the fuel cap 224. In addition or instead, when the example beverage container holder 220 is supported by the fuel cap 224 in a locked position, the lock projection(s) 260 is (are) arranged under the cap lower edge 228, thereby inhibiting removal of the second example beverage holder 220 from the fuel cap 224. The lock projection(s) 260, or at least one inner wall 236 supporting the lock projection(s) 260, may deflect or resiliently deform as necessary to allow the lock projection(s) 260 to pass along the cap outer surface 226 and then retract or return to the undeflected position when the lock projection(s) 260 clear the cap lower edge 228. In the locked position, the example beverage container holder 220 is mechanically detachably attached to the fuel cap 224.

However, deliberate application of force on the second example beverage container holder 220 can be used to resiliently deform the lock projection(s) 260, or the at least one inner wall 236 supporting the lock projection(s) 260, thereby allowing the second example beverage container holder 224 to be removed from the fuel cap 224.

In the locked position, the base inner surface engaging portion(s) 256 engage the cap outer surface to transfer angular rotation of the second example beverage container holder 220 to the fuel cap 224. The fuel cap 224 may thus be removed and/or replaced by gripping the second example beverage container holder 220. The grip surface(s) 284 on the upper wall 232 facilitate gripping of the second example beverage container holder 220.

The clear holes 280 in the upper wall 232 allow any snow or ice that collects within the cup portion 244 of the main passageway 240 to be pushed out of the cup portion 244.

With the cup portion 244 clear of snow or ice, the beverage container 222 may be arranged at least partly within the cup portion 244 of the main passageway 240. The friction ribs 282 engage the side wall 120 of the beverage container 222 to inhibit movement of the beverage container 222 relative to the second example beverage container holder 220. The beverage container 222 may be engaged with and removed from the second example beverage container holder 220 by deliberate application of manual force on the beverage container 222.

III. Third Example Beverage Container Holder

FIGS. 23-28 illustrate a third example beverage container holder 320 constructed in accordance with, and embodying, the principles of the present invention. The third example beverage container holder 320 is configured to be used with a snowmobile system defining a snowmobile cap 322 to support a beverage container 324. The third example beverage container holder 320 is configured to be supported by the example fuel cap 322 depicted in FIGS. 27 and 28. The example fuel cap 322 and the example beverage container 324 are or may be conventional and will not be described herein beyond that extent helpful to a complete understanding of the present invention. As is conventional, the example fuel cap 322 defines a cap outer surface 326 and a cap lower edge 328 and is adapted to be secured to a snowmobile to cover a fuel tank inlet defined by the snowmobile.

The third example beverage container holder 320 comprises a base 330, an upper wall 332, and a dividing wall 334. A main passageway 340 extends through the third example beverage container holder 320. The example main passageway 340 defines a container portion 342, a container portion 344, and an intermediate portion 346.

The example base 330 defines a base inner surface 350 defining at least one base inner first surface portion 352, at least one base inner second surface portion 354, and a plurality of base inner third surface portions 356. The example base 330 comprises six base inner first surface portions 352, six base inner second surface portions 354, and twelve base inner third surface portions 356 that are symmetrically arranged about a longitudinal axis A of the example base 330. The example base 330 defines the container portion 342 of the main passageway 340.

The example base 330 further defines at least one lock projection 360. The example lock projection 360 is formed on at least one of the base inner surface first portions 352. In the example base 330, one of the example lock projections 360 is formed on each of the base first portions 352.

The upper wall 332 of the third example beverage container holder 320 defines an upper wall inner surface 370 and an upper wall outer surface 372. At least one clear hole 380 extends between the upper wall inner surface 370 and the upper wall outer surface 372. In the example upper wall 332, at least one friction rib 382 is formed on the upper wall inner surface 370. Further, at least one grip surface 384 is formed on the upper wall outer surface 372 to facilitate gripping of the upper wall outer surface 372 as will be described in further detail below. The example upper wall 332 defines the container portion 344 of the main passageway 340.

The example dividing wall 334 defines the intermediate portion 346 of the main passageway 340.

Figures 27, 28:
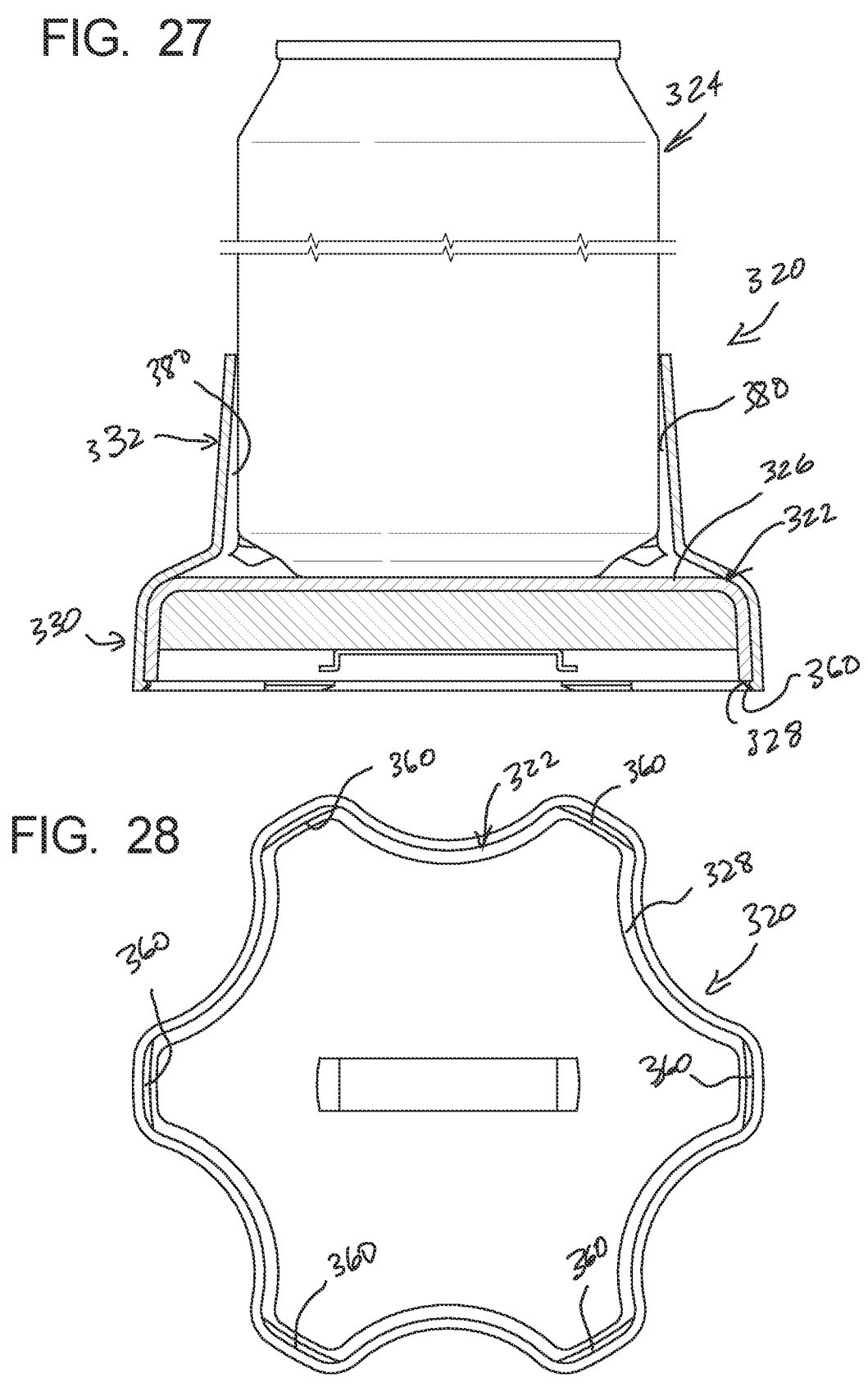
FIG. 27 is a section view of the third example beverage container holder supported by a third example fuel cap and supporting the example beverage container.
FIG. 28 is a bottom plan view of the third example beverage container holder supported by the third example fuel cap.

As is apparent in the bottom plan view of FIG. 28, the shape of the example base inner surface 350 substantially matches, but is slightly larger than, the shape of the outer surface 324 of the fuel cap 322. The respective shapes of the base inner surface 350 and cap outer surface 324 are thus configured relative to the cap outer surface 324 such that, with the first and second axes A and B aligned and with an angular position of the third example beverage container holder 320 in a desired orientation relative to an angular position of the fuel cap 322, the third example beverage holder 320 may be displaced along the axis B into a locked position as shown in FIGS. 27 and 28.

In the locked position, at least a portion of the fuel cap 322 is arranged within the container portion 342 of the main passageway 340 such that the lock projection(s) 360 is (are) arranged under the cap lower edge 326, thereby inhibiting removal of the third example beverage holder 320 from the fuel cap 322. The lock projection(s) 360, or wall portions supporting the lock projection(s) 360, may deflect or resiliently deform as necessary to allow the lock projection(s) 360 to pass along the cap outer surface 324 and then retract or return to the undeflected position when the lock projection(s) 360 clear the cap lower edge 326. Deliberate application of force on the third example beverage container holder 320 allows the third example beverage container holder 324 to be removed from the fuel cap 322.

In the locked position, the base inner surface engaging portion(s) 356 engage the cap outer surface to transfer angular rotation of the third example beverage container holder 320 to the fuel cap 322. The fuel cap 322 may thus be removed and/or replaced by gripping the third example beverage container holder 320. The grip surface(s) 384 on the upper wall 332 facilitate gripping of the third example beverage container holder 320.

The clear holes 380 in the upper wall 332 allow any snow or ice that collects within the cup portion 344 of the main passageway 340 to be pushed out of the cup portion 344.

With the cup portion 344 clear of snow or ice, the beverage container 324 may be arranged at least partly within the cup portion 344 of the main passageway 340. The friction ribs 382 engage the side wall 120 of the beverage container 324 to inhibit movement of the beverage container 324 relative to the third example beverage container holder 320. The beverage container 324 may be engaged with and removed from the third example beverage container holder 320 by deliberate application of manual force on the beverage container 324.

What is claimed is:

1. A beverage container holder for supporting a beverage container on a fuel cap defining a cap outer surface and a cap lower edge, the beverage container holder comprising:

a base defining a main passageway, where the base is configured to receive at least a portion of the fuel cap, the base defines at least one detent portion defining an undeflected position, where the at least one detent portion is resiliently deformable to allow the at least one detent portion to deform from the undeflected position configuration and away from the main passageway into a deformed configuration, and at least one lock projection extends from at least one detent portion;

an upper wall extending from the base, where the upper wall defines an inner surface adapted to frictionally engage the beverage container; and a dividing wall configured to define a container portion of the main passageway configured to receive at least a portion of the beverage container, a cap portion of the main passageway configured to receive at least a portion of the fuel cap; wherein the at least one lock projection extends from the at least one detent portion into the cap portion of the main passageway;

the dividing wall is spaced from the at least one lock projection such that, when the fuel cap is in a locked position relative to the base, the dividing wall engages at least a portion of the fuel cap and the at least one lock projection engages at least a portion of the cap lower edge;

the at least one lock projection is arranged such that, with the at least one detent portion in the deformed configuration and the fuel cap within the cap portion of the main passageway, the at least one lock projection is arranged to engage the cap outer surface as the fuel cap is displaced relative to the base while arranging the fuel cap in the locked position relative to the base, and as the fuel cap enters the locked position relative to the base, the at least one detent portion returns from the deformed configuration to the undeflected position such that at least one lock projection engages the cap lower edge to detachably attach the beverage container holder to the fuel cap; and the base is configured such that, with the beverage container holder detachably attached to the fuel cap, arranging the beverage container within the container portion of the main passageway causes at least a portion of the inner surface of the upper wall to frictionally engage the beverage container to detachably attach the beverage container relative to the fuel cap.

2. A beverage container holder as recited in claim 1, in which each detent portion is defined by a cutout formed in the base.

3. A beverage container holder as recited in claim 1, in which at least one rib extends from the inner surface of the upper wall, where the at least one rib is adapted to enhance frictional engagement of the inner surface of the upper wall with the beverage container.

4. A system for supporting a beverage container comprising:

a fuel cap defining a cap lower edge; and a beverage container holder comprising a base defining at least one resiliently deformable detent portion, where the detent portion defines at least one lock projection;

an upper wall extending from the base, where the upper wall is adapted to engage the beverage container and defines at least one clear opening;

a dividing wall configured to define a container portion configured to receive at least a portion of the beverage container, and a cap portion configured to receive at least a portion of the fuel cap; wherein the at least one detent portion resiliently deforms from an undeflected position when the at least one lock projection engages the outer surface of the fuel cap as the beverage container holder is detachably attached to the fuel cap; and when the beverage container holder is detachably attached to the fuel cap the dividing wall engages at least a portion of the fuel cap, and the at least one detent portion returns to the undeflected position such that the at least one lock projection extends under at least a portion of the cap lower edge to inhibit movement of the beverage container holder relative to the fuel cap; and when the at least the portion of the fuel cap is arranged in the locked configuration such that the beverage container holder is detachably attached to the fuel cap, the at least one clear opening in the upper wall allows debris within the container portion to be pushed out of the container portion through the at least one clear opening.

5. A beverage container holder as recited in claim 4, in which the at least one lock projection is supported by the at least one detent portion for movement relative to the fuel cap to facilitate engagement of the at least one lock projection with and disengagement of the at least one lock projection from the fuel cap.

6. A beverage container holder as recited in claim 4, in which each detent portion is defined by a cutout formed in the base.

7. A beverage container holder as recited in claim 4, in which the upper wall defines at least one rib adapted to frictionally engage the beverage container.

8. A method of supporting a beverage container from a fuel cap defining a lower cap edge, the method comprising the steps of:

providing a base defining at least one resiliently deformable detent portion, where the detent portion defines at least one lock projection adapted to engage the fuel cap, extending an upper wall from the base;

providing a dividing wall configured to define a container portion configured to receive at least a portion of the beverage container, and a cap portion configured to receive at least a portion of the fuel cap;

displacing the base towards the fuel cap such that the at least one lock projection engages the fuel cap to deform the at least one detent portion such that at least a portion of the cap is within the container portion;

further displacing the base towards the fuel cap such that the at least one lock projection engages the fuel cap to deform the at least one detent portion such that the at least one lock projection is arranged under the cap lower edge to detachably attach the beverage container holder to the fuel cap;

forcing any debris within the container portion out of the container portion through the at least one clear opening; and arranging at least a portion of the beverage container within the container portion of the main passageway such that the beverage container engages and is supported relative to the fuel cap by the upper wall.

9. A method as recited in claim 8, in which the step of providing the base comprises the step of extending at least one lock projection from the base, where the lock projection is configured to engage the fuel cap to inhibit inadvertent removal of the beverage container holder from the fuel cap.

10. A method as recited in claim 8, in which the step of providing the dividing wall comprises the step of defining an opening in the dividing wall to define a main passageway that extends between the container portion and the cap portion.

11. A method as recited in claim 8, in which the step of providing the base comprises the step of forming at least one cutout in the base to define the at least one detent portion.

12. A method as recited in claim 8, in which the step of providing the upper wall comprises the step of forming at least one rib in the upper wall such that the at least one rib frictionally engages the beverage container when the beverage container is within the container portion of the main passageway.

\* \* \* \* \*